May 2, 1967 B. E. GUISINGER 3,317,681
PLAYBACK PREAMPLIFIER CIRCUIT
Filed May 7, 1963
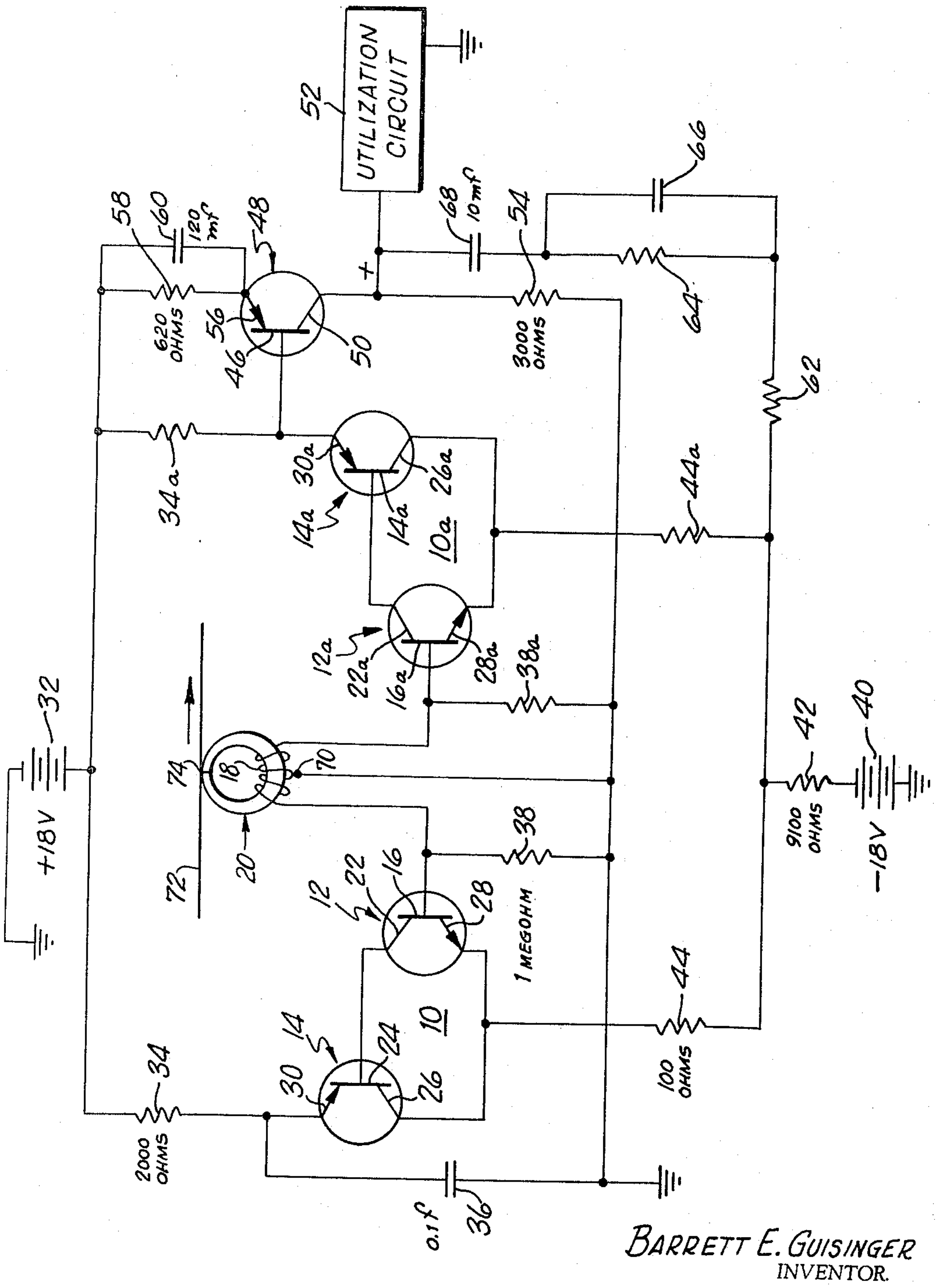
BARRETT E. GUISINGER
INVENTOR.
BY Nathan N. Kallman
ATTORNEY 3,317,681
PLAYBACK PREAMPLIFIER CIRCUIT
Barrett E. Guisinger, Redwood City, Calif., assignor to Ampex Corporation, Redwood City, Calif., a corporation of California
Filed May 7, 1963, Ser. No. 278,721
6 Claims. (Cl. 179—100.2)

This invention relates to an amplifier circuit, and in particular to a transistor preamplifier circuit for a magnetic tape playback system.

Known preamplifier circuits that are employed in magnetic playback systems are disposed between a magnetic reproduce head circuit and the processing and demodulation stages of the system. In such systems, a capacitor is generally coupled between the low impedance source or head circuit and the high impedance input circuit of the preamplifier to block direct current from the head. The direct current appeared whenever the playback system was started or stopped causing the capacitor to charge or discharge through the inductive windings associated with the magnetic head. This undesirable direct current led to distortion of the signal being reproduced from a recorded magnetic tape.

Furthermore, when prior known transistor preamplifier circuits were used with magnetic reproduce heads, specially designed heads with a predetermined number of coil windings to provide proper inductance were required. Such heads were limited to operation within a defined frequency band, and therefore different heads and components were necessary for operation in different frequency ranges.

An object of this invention is to provide a novel and improved transistorized preamplifier circuit for a playback system.

Another object of this invention is to provide a magnetic playback system that eliminates the requirements for a coupling capacitor between a reproduce head and a preamplifier circuit.

In accordance with this invention, a playback preamplifier circuit comprises a symmetrical configuration of two similar pairs of transistors that form a differential amplifier, which is coupled to the output circuit of a magnetic playback head. Each pair includes transistors that are complementary and compound connected, and the like pairs are coupled in a balanced circuit whereby common mode rejection is achieved.

In the quiescent state, with no information input signal sensed by the magnetic head, the symmetrical pairs of transistors are biased so as to conduct equally, and there is no output signal. When an information input signal having an alternating waveform is derived from a recorded tape that traverses the magnetic head, each transistor pair is driven towards saturation alternately, and conducts in accordance with the variations of the alternating signal sensed by the magnetic head. A single ended output signal is derived from one transistor pair of the differential amplifier for further utilization. When the playback system is started or stopped, no undesirable head magnetization appears that would ordinarily result from undesirable capacitor charging or discharge. Thus, by means of the balanced transistor configuration, D.C. stability is assured and the necessity for an input coupling capacitor is eliminated. In addition, a negative feedback loop is provided to compensate for the nonuniform frequency characteristics of the magnetic playback head, and to obtain a flat frequency response.

The invention will be described in greater detail with reference to the sole figure of the drawing, which is a schematic diagram of the inventive circuit.

In the drawing, a preamplifier comprises a first pair 10 of compound connected transistors 12 and 14, the input electrode or base 16 of transistor 12 being coupled directly to one end of an inductive coil 18 wound around a magnetic core 20 of a reproduce head. The output electrode or collector 22 of the transistor 12 is connected to the input electrode or base 24 of the second transistor 14, whereas the collector 26 of the second transistor 14 is connected to the common electrode or emitter 28 of the transistor 12. The emitter 30 of the transistor 14 is coupled to a source of positive potential 32 through a resistor 34, and also is coupled to a source of reference potential, such as ground, through a bypass capacitor 36. A bias resistor 38 is coupled to the base 16 of the transistor 12 and to ground potential.

Coupled to the other end of the inductive coil 18 is a matching pair **10*a* of compound connected transistors 12*a* and 14*a* having a similar configuration with similar elements, thereby providing a balanced amplifier circuit in connection with the magnetic head circuit. A negative source of potential 40 is coupled through a common emitter resistor 42 and balancing resistors 44, 44*a* respectively to the emitters 28, 28*a* of the transistor 12, 12*a* to provide emitter degeneration. The voltage drop is substantially constant through resistor 42, which serves as a constant current source in conjunction with the voltage supply 40. As a result of the balanced differential amplifier configuration, the current that appears in the resistor 42 is equally divided between the resistors 44 and 44*a*, and similarly between resistors 34 and 34*a***.

During operation of the circuit, a signal output is taken from the emitter **30*a* of the transistor 14*a* and applied to the base 46 of a transistor amplifier 48, that in turn provides an amplified output signal from its collector 50 to a utilization circuit 52, which may be a processor of a playback system. The collector 50 of the transistor 48 is also coupled through a load resistor 54 to ground potential. The emitter 56 of the amplifier 48 is coupled to the source of positive voltage 32 through a bias resistor 58 that is shunted by a bypass capacitor 60**.

A feedback equalization circuit, comprising series resistors 62 and 64 and a shunt capacitor 66, is connected in the output circuit to the input of the utilization circuit 52 through a D.C. blocking capacitor 68. The equalization circuit determines the characteristic of the frequency response to meet established standards, such as set by the National Association of Broadcasters (NAB).

To provide cancellation of spurious magnetization components, a center tap 70 may be connected to the head coil 18 and between the bias resistors 38 and **38*a***.

In operation a recorded magnetic tape 72 is driven by tape reeling and guiding means (not shown) to traverse a nonmagnetic gap 74 disposed in the magnetic core or head 20, in a well known manner. In the absence of an input signal from the magnetic head circuit, the balanced differential amplifier configuration provides no output signal to the amplifier stage 48. This is so because in the quiescent state, the transistor pair 12 and 14 and the transistor pair **12*a* and 14*a* are conducting equally. However, when the playback head 20 sensed variations in flux caused by a magnetically recorded information signal, an alternating current signal appears in the inductive winding 18** of the head circuit.

The signal output from the head circuit is applied to the bases 16, **16*a* of the transistors 12, 12*a* in antiphase. As the input signal goes positive, the transistor 12 is driven towards saturation and conducts more heavily, whereas the opposing transistor 12*a* is driven towards cut-off. Increased collector current from the conducting NPN transistor 12 causes increased base current for transistor 14, and a resultant increase in emitter-collector current of the PNP transistor 14. The voltage drop across the resistance 44 as the current increases biases the emitter 28 and tends to turn off the transistor 12. Concurrently, as the current through the resistance 44 increases, the current through the balancing resistor 44***a* decreases, whereby the current through the emitter biasing resistor 34*a* is also decreased. Thus, emitter 30*a* of the PNP transistor 14*a* goes positive while the emitter 28*a* of the NPN transistor 12*a* is biased more negative, and the compound connected transistors 12*a* and 14*a* are driven towards saturation.

An output signal is derived from the emitter 30*a* and fed to the amplifier 48 for amplification and subsequent application to the utilization circuit 52 for further processing. The collector current from transistors 14, 14*a* is also directed through a negative feedback path to the emitters 28, 28*a* of transistors 12 and 12*a* whereby the input impedance of the transistor circuit is varied in accordance with the variations in impedance of the head as the frequency changes.

In a particular frequency range, the impedance of the capacitor 66 in the equalization circuit is such that the capacitor 66 serves as a short circuit whereby the feedback is proportional to the resistance 62. The parameters of the elements 62, 64 and 66 are such that the characteristic of the equalization circuit levels out at a particular predetermined frequency range.

The circuit of this invention provides high gain and stability with a high input impedance using relatively few components. The balanced configuration including a balanced input circuit affords common mode rejection. Since the head is coupled directly to the balanced input circuit of the preamplifier, no significant direct current flows through the head at any time during the operation of the apparatus, including the "On" and "Off" switching intervals. By using compound connected complementary transistors, direct coupling and negative feedback are obtained, in addition to D.C. stability. Also, the preamplifier circuit of this invention may be used with conventional high inductance magnetic heads that were designed for vacuum tube circuitry, as well as low inductance heads that were designed for transistor circuits. An excellent signal-to-noise ratio, and very good temperature stability at levels exceeding 60° C. are realized.

It should be noted that the scope of the invention is not necessarily limited to the values of the resistors and capacitors designated in the drawing. In addition, the inventive preamplifier circuit may be utilized in video and data recorders, as well as audio recorders.

What is claimed is:

1. A playback preamplifier circuit comprising:
a magnetic reproduce head;
an inductive winding coupled to said head;
a first pair of compound connected transistors having an input coupled directly to one end of the winding;
a second like pair of compound connected transistors having an input coupled directly to the other end of the winding;
said pairs forming a balanced differential amplifier configuration; and
means for biasing said transistor pairs.

2. A playback preamplifier circuit comprising:
a magnetic reproduce head;
an inductive winding coupled to said head;
a first pair of compound connected transistors having an input coupled directly to one end of the winding, including an NPN transistor and PNP transistor connected in a complementary configuration;
a second like pair of compound connected transistors having an input coupled directly to the other end of the winding;
said pairs connected to the winding to form a balanced differential amplifier configuration; and
direct current means for biasing said transistor pairs to be substantially equally conducting in the absence of a signal from the winding.

3. A transistorized preamplifier for magnetic tape playback systems, having a magnetic reproduce head and an inductive winding coupled thereto, comprising:

a first pair of compound connected complementary transistors having base, emitter and collector electrodes;
a second like pair of compound connected complementary transistors;
means for coupling the inputs of said first and second pairs of transistors to the head winding to form a balanced differential amplifier configuration;
a voltage source for providing bias voltages of said transistor pairs;
an amplifier having input and output electrodes;
means coupled to the input electrode of said amplifier for deriving a single-ended output signal from the differential amplifier; and
a feedback loop coupled between the output electrode of such amplifier and the emitter circuit of the differential amplifier.

4. A transistor preamplifier for a magnetic tape playback system, having a magnetic reproduce head and an inductive winding coupled thereto, comprising:
first and second transistors, each having base, emitter and collector electrodes;
third and fourth transistors, each having base, collector and emitter electrodes, poled oppositely to the first and second transistors;
the base electrodes of said third and fourth transistors being connected to the collector electrodes of said first and second transistors respectively;
the collector electrodes of said third and fourth transistors being connected to the emitter electrodes of said first and second transistors respectively;
means for applying bias voltages to the emitter electrodes of said first, second, third and fourth transistors;
means for deriving an alternating input signal from the reproduce head, and for applying such input signals in antiphase simultaneously to the base electrodes of said first and second transistors;
means for deriving a single-ended output from the emitter electrode of said fourth transistor;
a bypass capacitor coupled between the emitter electrode of said third transistor and ground potential;
a utilization circuit for processing the output signal derived from the emitter electrode of said fourth transistor; and
an equalization circuit coupled between the emitters of said first and second transistors and said utilization circuit.

5. A transistor preamplifier for a magnetic tape playback system, having a magnetic reproduce head and an inductive winding coupled thereto, comprising:
first and second transistors, each having base, emitter and collector electrodes;
third and fourth transistors, each having base, collector and emitter electrodes, poled oppositely to the first and second transistors;
the base electrodes of said third and fourth transistors being connected to the collector electrodes of said first and second transistors respectively;
the collector electrodes of said third and fourth transistors being connected at junctions to the emitter electrodes of said first and second transistors respectively;
bias resistors coupled to the bases of said first and second transistors;
means for applying bias voltages to the emitter electrodes of said first, second, third and fourth transistors;
balancing resistors coupled between the junctions and the bias voltage applying means;
means for deriving an alternating input signal from the reproduce head, and for applying such input signal in antiphase simultaneously to the base electrodes of said first and second transistors;
means for deriving a single-ended output from the emitter electrode of said fourth transistor;

- a bypass capacitor coupled between the emitter electrode of said third transistor and ground potential;
- a utilization circuit for processing the output signal derived from the emitter electrode of said fourth transistors; and
- an equalization circuit coupled between the junction of said balancing resistors with said bias voltage applying means and said utilization circuit.

6. A transistorized preamplifier for magnetic tape playback systems, having a magnetic reproduce head and an inductive winding coupled thereto, comprising:
- a first pair of compound connected complementary transistors, each having an input, output, and common electrode;
- a second like pair of compound connected complementary transistors;
- means for coupling the input electrodes of each of said pairs of said winding to form a balanced differential amplifier configuration;
- a voltage source for providing bias voltages to the common electrodes of said transistor pairs;
- an output amplifier having input and output electrodes; means coupled to the input electrode of said output amplifier for deriving a single-ended output signal from one transistor pair of the differential amplifier; and
- a negative feedback loop coupled between the output electrode of such output amplifier and the input circuit of the differential amplifier.

References Cited by the Examiner

UNITED STATES PATENTS

| | | | |
|---|---|---|---|
| 2,531,458 | 11/1950 | Nye | 330—69 |
| 3,068,327 | 12/1962 | Davidson | 179—100.2 |

OTHER REFERENCES

Page 35, December 1960, Beneteau, "Problem 163—Solution A," Electronic Products Magazine.

Pages 56–57, February 1962, Ruben, "Difference Amplifier," IBM Technical Disclosure Bulletin, vol. 4, No. 9.

BERNARD KONICK, *Primary Examiner.*

IRVING L. SRAGOW, *Examiner.*

L. G. KURLAND, *Assistant Examiner.*